United States Patent
Katikaneni et al.

(10) Patent No.: US 9,680,379 B2
(45) Date of Patent: Jun. 13, 2017

(54) DC-DC CONVERTER USING A POWER DRIVING SIGNAL WITH FIXED ON-TIME

(71) Applicant: FIDELIX CO., LTD., Seongnam-si, Gyeonggi-do (KR)

(72) Inventors: Pradeep Katikaneni, Plano, TX (US); Won Eung Kim, Plano, TX (US)

(73) Assignee: FIDELIX CO., LTD., Seongnam-si, Gyeonggi-Do (KR)

( * ) Notice: Subject to any disclaimer, the term of this patent is extended or adjusted under 35 U.S.C. 154(b) by 88 days.

(21) Appl. No.: 14/844,376

(22) Filed: Sep. 3, 2015

(65) Prior Publication Data

US 2017/0070144 A1    Mar. 9, 2017

(51) Int. Cl.
*H02M 3/158* (2006.01)
*H02M 3/157* (2006.01)
*H02M 3/156* (2006.01)

(52) U.S. Cl.
CPC ............ *H02M 3/158* (2013.01); *H02M 3/156* (2013.01); *H02M 3/157* (2013.01)

(58) Field of Classification Search
CPC .......... H02M 3/156; H02M 1/36; H02M 3/07; H02M 3/1563; H02M 3/157; H02M 3/158; H02M 2001/0032; H02M 2001/007; H02M 3/1584; H02M 3/1588; H02M 1/00; H02M 1/4225; H02M 2001/0009; H02M 2001/0012

See application file for complete search history.

(56) References Cited

U.S. PATENT DOCUMENTS

| 4,700,285 A | 10/1987 | Szepesi | |
|---|---|---|---|
| 2006/0261794 A1* | 11/2006 | May | H02M 3/158 323/283 |
| 2015/0097538 A1* | 4/2015 | Le | H02M 3/158 323/271 |

OTHER PUBLICATIONS

"FAN 7631 Advanced Pulse Frequency Modulation (PFM) Controller for Half-Bridge Resonant Converters", Fairchild Semiconductor Corporation, Apr. 2012, pp. 1-20.

* cited by examiner

*Primary Examiner* — Adolf Berhane
*Assistant Examiner* — Henry Lee, III
(74) *Attorney, Agent, or Firm* — Kile Park Reed & Houtteman PLLC

(57) ABSTRACT

A DC-DC converter includes a voltage converting block that converts an input supply voltage to an output voltage and includes a power switch turning on at on-time of a power driving signal, a power driving block that generates the power driving signal using an oscillation output signal, wherein a cycle of the power driving signal varies according to a cycle of the oscillation output signal and a length of the on-time of the power driving signal is fixed to a power time regardless of variation of the cycle of the oscillation output signal, a voltage-controlled oscillating block that generates the oscillation output signal, the cycle of which is controlled according to a level of an oscillation control signal, and a target tracking block that generates a feedback voltage and controls the level of the oscillation control signal such that a feedback voltage follows a target reference voltage.

11 Claims, 6 Drawing Sheets

DC-DC CONVERTER USING A POWER DRIVING SIGNAL WITH FIXED ON-TIME

BACKGROUND

1. Field of the Invention

The present invention relates to a direct current to direct current (DC-DC) converter and, more particularly, to a DC-DC converter using a power driving signal with fixed on-time.

2. Discussion of Related Art

In general, a DC-DC converter is used in various electronic apparatuses, such as cellular phones, radio-frequency (RF) communication apparatuses, etc., to convert an input supply voltage into an appropriate output voltage. The DC-DC converters are generally designed to restore an output voltage to a target level when an input supply voltage fluctuates.

The conventional DC-DC converters employ a method of restoring an output voltage using a ramp signal generated in the form of regular ripples. Thus, a ripple generator having a wide dynamic range is required in the conventional DC-DC converters to generate the ramp signal.

As a result, however, the conventional DC-DC converters requiring the ripple generator have a complicated circuit structure and require high current consumption. Also, the ramp signal generated by and used in the conventional DC-DC converters is vulnerable to noise.

Accordingly, there is a growing need to develop a DC-DC converter that does not include a ripple generator and thus has a simpler circuit structure, requires lower current consumption, and is more resistant to noises.

SUMMARY OF THE INVENTION

The above mentioned and other drawbacks and deficiencies of the prior art are overcome or alleviated by a DC-DC converter according to the present invention.

According to an aspect of the present invention, a DC-DC converter includes a voltage converting block that converts an input supply voltage to an output voltage having a target level and includes a power switch which is turned on at on-time of a power driving signal, wherein the input supply voltage is applied through the power switch when the power switch is turned on; a power driving block that generates the power driving signal using an oscillation output signal, wherein a cycle of the power driving signal varies in accordance with a cycle of the oscillation output signal and a length of the on-time of the power driving signal is fixed to a power time regardless of variation of the cycle of the oscillation output signal; a voltage-controlled oscillating block that generates the oscillation output signal, the cycle of which is controlled according to a level of an oscillation control signal; and a target tracking block that generates a feedback voltage using the output voltage and controls the level of the oscillation control signal such that the feedback voltage follows a target reference voltage to stabilize the output voltage to a target level.

The power driving block may include a time setting unit that generates a time setting signal using the oscillation output signal, wherein a cycle of the time setting signal varies in accordance with the cycle of the oscillation output signal, and a length of on-time of the time setting signal is fixed to the power time, and a power driving unit that receives the time setting signal and generates the power driving signal, wherein a pull-up voltage of the power driving signal is level-shifted with respect to a pull-up voltage of the time setting signal. A level of the feedback voltage increases as a level of the output voltage increases, the level of the oscillation control signal decreases as the level of the feedback voltage increases, the cycle of the oscillation output signal increases as the level of the oscillation control signal decreases, the cycle of the time setting signal increases as the cycle of the oscillation output signal increases, and the cycle of the power driving signal increases as the cycle of the time setting signal increases. The length of the on-time of the time setting signal and the length of the on-time of the power driving signal maintain a same time period as the power time while the cycle of the time setting signal and the cycle of the power driving signal increase.

The time setting unit may include a flip-flop that generates the time setting signal responding to the oscillation output signal and a reset driving signal, wherein the time setting signal is activated in response to the oscillation output signal and deactivated in response to the reset driving signal, and a power-time generating unit that generates the reset driving signal using the time setting signal, the reset driving signal being activated when a time corresponding to the power time elapses from the activation of the time setting signal. The power-time generating unit may include a time capacitor formed between a ground voltage and a time-preparatory terminal, a charging transistor formed between an internal supply voltage and the time-preparatory terminal, the charging transistor being turned on to charge the time capacitor in response to the activation of the time setting signal, a discharging transistor formed in parallel with the time capacitor between the ground voltage and the time-preparatory terminal, the discharging transistor being turned on and driven to discharge the time capacitor in response to deactivation of the time setting signal, and a time comparator that generates the reset driving signal by comparing a voltage of the time-preparatory terminal with a time reference voltage.

The voltage-controlled oscillating block may include an oscillating unit that generates the oscillation output signal, wherein the cycle of the oscillation output signal varies according to an amount of a sourcing current, a sourcing-current supply unit that supplies the sourcing current to the oscillating unit, wherein the amount of the sourcing current varies according to a level of a current control signal, and a current control unit that generates the current control signal to the sourcing-current supply unit, wherein the level of the current control signal varies according to the level of the oscillation control signal.

The target tracking block may include a proportional integral derivative (PID) control unit that controls the level of the oscillation control signal by performing PID correction on a tracking error so that the feedback voltage follows the target reference voltage, wherein the tracking error corresponds to a difference between the target reference voltage and the feedback voltage. The PID control unit may include a proportional control unit that generates a proportional voltage by reflecting a proportional gain rate into the feedback voltage, a differential control unit that generates a differential voltage by reflecting a differential gain rate into a differential error that is generated when differentiation is conducted on the tracking error, an integral control unit that generates an integration voltage by reflecting an integration gain rate into an integration error that is generated when integration is conducted on the tracking error, and an adding unit that generates the oscillation control signal by adding the proportional voltage, the differential voltage, and the integration voltage. The target reference voltage is provided to the differential control unit and the integral control unit to conduct the differentiation and integration, respectively, on the tracking error.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
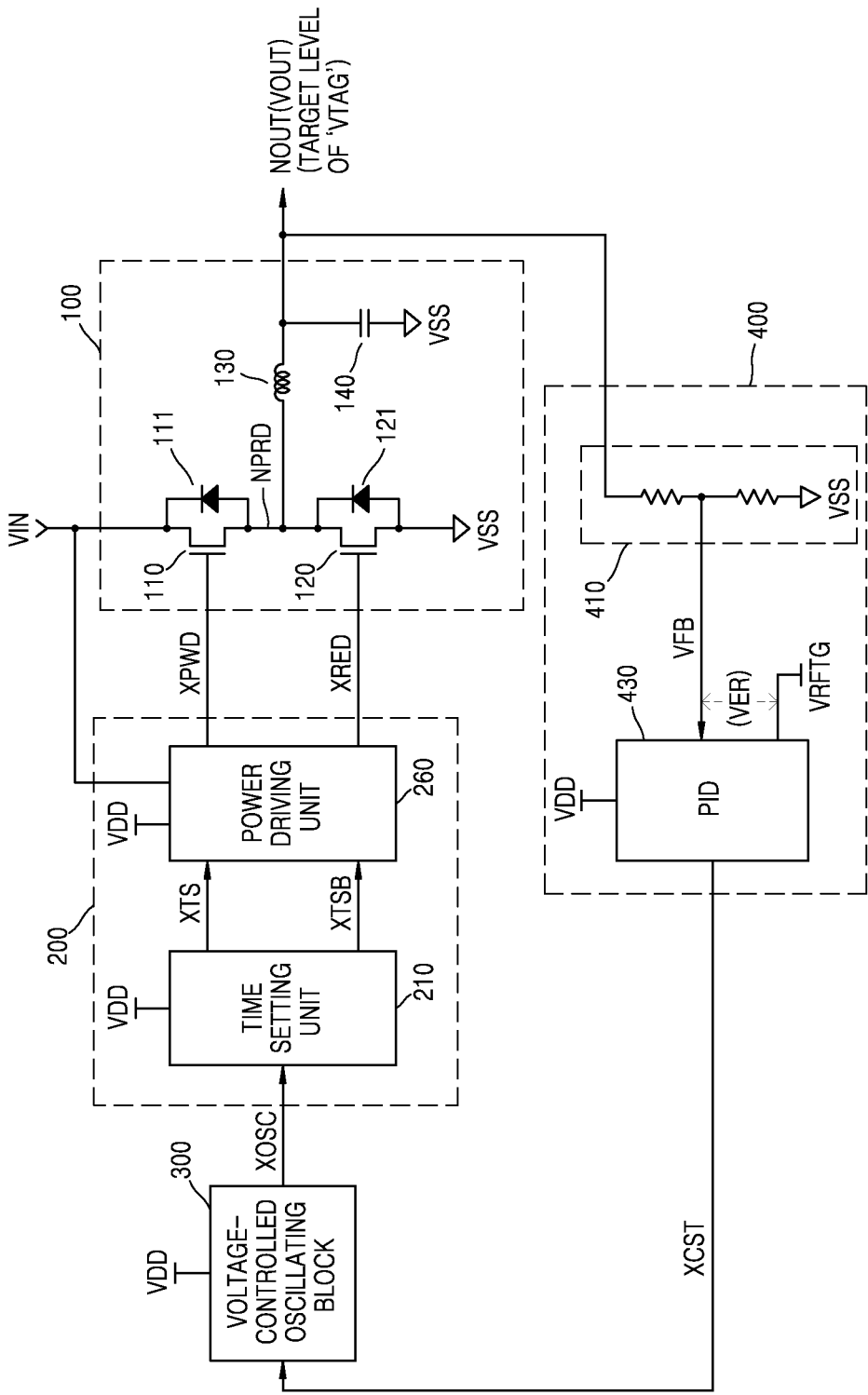
FIG. 1 illustrates a DC-DC converter according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present disclosure, the term "input supply voltage" means a voltage that is provided from the outside of a direct current to direct current (DC-DC) converter according to an exemplary embodiment of the present invention and that is intentionally/unintentionally variable. A DC-DC converter according to an exemplary embodiment of the present invention is driven to provide an output voltage corresponding to a preset target level with respect to an input supply voltage that is a variable voltage.

In the present disclosure, the term "internal supply voltage" indicates a voltage that is, for example, lower than the input supply voltage and may be used as a supply voltage for some elements of a DC-DC converter according to an exemplary embodiment of the present invention.

Also, the present disclosure refers to various reference voltages. The reference voltages are, for example, lower than the input supply voltage, the output voltage, and the internal supply voltage, and may be set to be the same or to be different from one another.

Exemplary embodiments of the present invention will now be described in more detail with reference to the drawings.

FIG. 1 illustrates a DC-DC converter according to an exemplary embodiment of the present invention.

Referring to FIG. 1, the DC-DC converter according to an exemplary embodiment of the present invention includes a voltage converting block 100, a power driving block 200, a voltage-controlled oscillating block 300, and a target tracking block 400.

The voltage converting block 100 includes a power switch 110 which is turned on at on-time of a power driving signal XPWD (i.e., at or during time that the power driving signal XPWD is activated). The voltage converting block 100 converts an input supply voltage VIN, which is applied when the power switch 110 is turned on, into an output voltage VOUT corresponding to a target level VTAG.

The voltage converting block 100 further includes a driving-preparatory terminal NPRD, an output terminal NOUT, a rectification switch 120, an inductor 130, and an output capacitor 140.

The power switch 110 is controlled by the power driving signal XPWD provided from the power driving block 200. In detail, the power switch 110 is turned on in response to activation of the power driving signal XPWD. As a result, an input supply voltage VIN provided from a power source is applied to the driving-preparatory terminal NPRD.

The power switch 110 may be implemented with a metal-oxide-semiconductor (MOS) transistor configured to be gated by the power driving signal XPWD to apply the input supply voltage VIN to the driving-preparatory terminal NPRD. In this embodiment, the power switch 110 functions as a high-side switch for controlling the amount of current to be supplied to the inductor 130.

The voltage converting block 100 may further include a power diode 111 and a rectification diode 121. The power diode 111 is, for example, a P-N junction that is parasitic on the power switch 110 and is maintained in a reversely biased state during normal buck conversion.

The rectification switch 120 lowers a voltage of the driving-preparatory terminal NPRD while the power switch 110 is 'off'. In detail, the rectification switch 120 is controlled by a rectification driving signal XRED supplied from the power driving block 200. In this embodiment, the rectification driving signal XRED, the phase of which is opposite to that of the power driving signal XPWD, is activated not to overlap with the power driving signal XPWD.

The rectification switch 120 may be implemented with a MOS transistor configured to be gated by the rectification driving signal XRED to lower the voltage of the driving-preparatory terminal NPRD to be substantially the same as a ground voltage VSS. In this embodiment, the rectification switch 120 functions as a low-side switch for controlling the amount of current to be supplied to the inductor 130.

The rectification diode 121 is, for example, a P-N junction that is parasitic on the rectification switch 120 and is maintained in the reversely biased state during normal buck conversion.

The inductor 130 is formed between the driving-preparatory terminal NPRE and the output terminal NOUT. The output capacitor 140 accumulates electric charges generated at the output terminal NOUT. In this embodiment, the output voltage VOUT depends on the amount of the electric charges generated at the output terminal NOUT and accumulated in the output capacitor 140.

In the present embodiment, a switching cycle of the power switch 110 may be controlled to control the amount of current to be supplied to the inductor 130. The output voltage VOUT may be controlled by controlling the amount of current to be supplied to the inductor 130.

In other words, a level of the output voltage VOUT is proportional to the switching cycle and on-time of the power switch 110, i.e., a duty cycle D of the power driving signal XPWD, which is expressed in Equation 1 below.

$$Vout = D \times Vin = (t\_on/T) \times Vin,$$ [Equation 1]

Wherein "Vout" denotes a level of the output voltage VOUT, "Vin" denotes a level of the input supply voltage VIN, "T" denotes the switching cycle of the power driving signal XPWD, and "t_on" denotes the length of an activation section of the power driving signal XPWD in each of the switching cycles, i.e., a time period in which the power switch 110 is 'on'.

In a DC-DC converter according to an exemplary embodiment of the present invention, the length of on-time in which the power driving signal XPWD is activated is fixed to a power time tpw regardless of a switching cycle of the power switch 110. That is, "t_on" is a fixed value in Equation 1.

Thus, in a DC-DC converter according to an exemplary embodiment of the present invention, the level of the output voltage VOUT is inversely proportional to the switching cycle of the power switch 110, i.e., the cycle of the power driving signal XPWD.

Referring again to FIG. 1, the power driving block 200 generates the power driving signal XPWD and the rectification driving signal XRED using an oscillation output signal XOSC.

In this embodiment, the cycle of the power driving signal XPWD depends on the cycle of the oscillation output signal XOSC. However, the length of the activation section of the power driving signal XPWD is fixed to the power time ptw that is not related to a variation in the cycle of the oscillation output signal XOSC.

In detail, the power driving block 200 includes a time setting unit 210 and a power driving unit 260.

The time setting unit 210 generates a time setting signal XTS using the oscillation output signal XOSC. A cycle of the time setting signal XTS depends on the cycle of the oscillation output signal XOSC. However, the length of an activation section of the time setting signal XTS is fixed to the power time tpw that is not related to a variation in the cycle of the oscillation output signal XOSC.

In the present embodiment, the time setting unit 210 uses an internal supply voltage VDD as a pull-up voltage.

Figure 2:
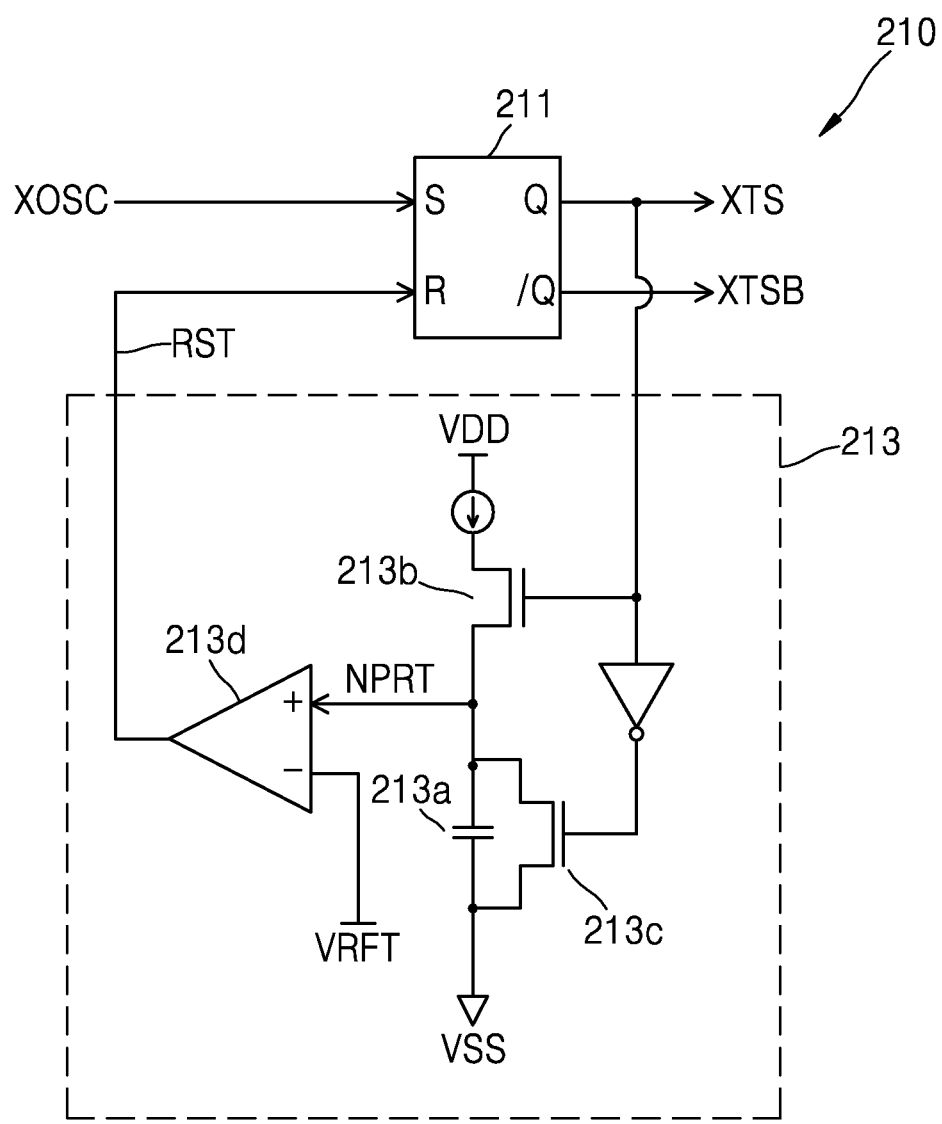
FIG. 2 is a detailed circuit diagram of a time setting unit of FIG. 1.

FIG. 2 is a detailed circuit diagram of the time setting unit 210 of FIG. 1. In detail, referring to FIG. 2, the time setting unit 210 includes a flip-flop 211 and a power-time generating unit 213.

The flip-flop 211 generates the time setting signal XTS responding to the oscillation output signal XOSC and a reset driving signal RST. The time setting signal XTS is activated in response to activation of the oscillation output signal XOSC, and deactivated in response to the reset driving signal RST.

The flip-flop 211 may be implemented with an RS flip-flop configured to receive the oscillation output signal XOSC via a set terminal S, receive the reset driving signal RST via a reset terminal R, provide the time setting signal XTS via an output terminal Q, and provide an inverted time setting signal XTSB via an inverted output terminal /Q. The flip-flop 211 may be driven to a logic state shown in Table 1 below.

TABLE 1

| S | R | Q(i + 1) | /Q(i + 1) |
|---|---|---|---|
| 0 | 0 | Q(i) | /Q(i) |
| 0 | 1 | 0 | 1 |
| 1 | 0 | 1 | 0 |
| 1 | 1 | invalid | invalid |

The inverted time setting signal XTSB has an inverted logic state with respect to the time setting signal XTS.

The power-time generating unit 213 generates the reset driving signal RST that is activated when a time corresponding to the power time tpw elapses from activation of the time setting signal XTS.

In more detail, the power-time generating unit 213 includes a time capacitor 213a, a charging transistor 213b, a discharging transistor 213c, and a time comparator 213d.

The time capacitor 213a is formed between a ground voltage VSS and a time-preparatory terminal NPRT. The charging transistor 213b is formed between a supply power VDD and the time-preparatory terminal NPRT. The discharging transistor 213c is formed in parallel with the time capacitor 213a between the ground voltage VSS and the time-preparatory terminal NPRT.

The time comparator 213d generates the reset driving signal RST by comparing a voltage of the time-preparatory terminal NPRT with a time reference voltage VRFT.

Operations of the power-time generating unit 213 having the above structure will be described below.

Figure 3:
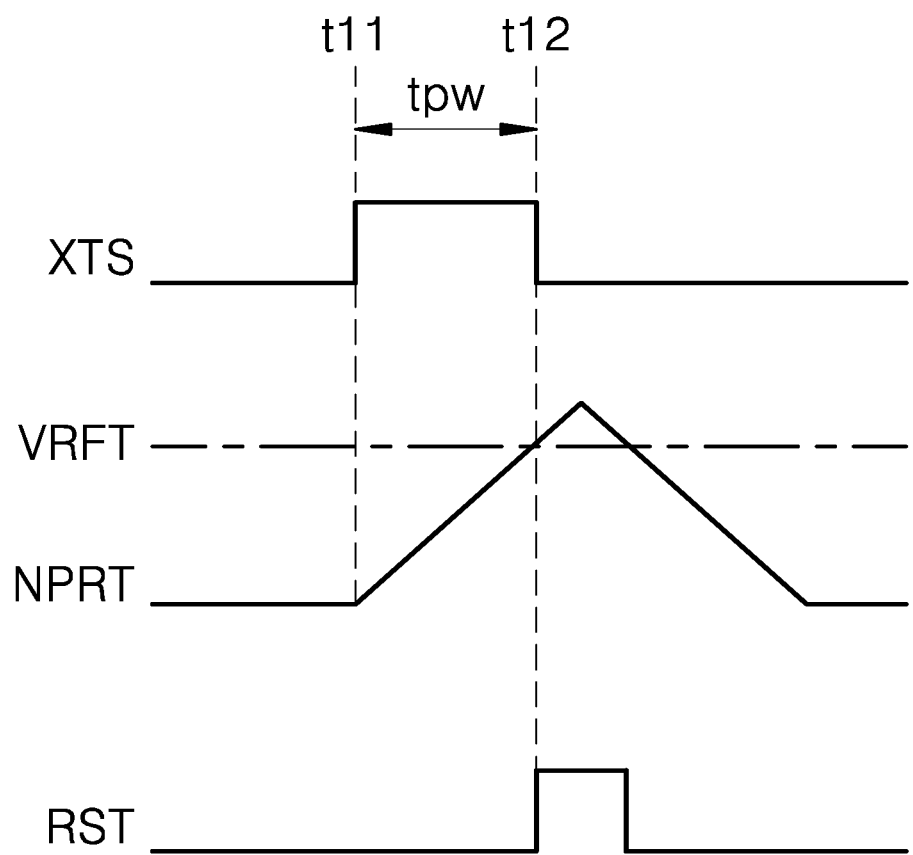
FIG. 3 is a graphical view of signal waveforms of signals in the time setting unit of FIG. 2.

The charging transistor 213b is turned on in response to activation of the time setting signal XTS (referring to 't11' of FIG. 3). As the time capacitor 213a is charged, the voltage of the time-preparatory terminal NPRT increases.

When the voltage of the time-preparatory terminal NPRT is higher than the time reference voltage VRFT (referring to 't12' of FIG. 3), the reset driving signal RST is activated and the time setting signal XTS is deactivated.

When the time setting signal XTS is deactivated, the discharging transistor 213c is turned on. As the time capacitor 213a is discharged, the voltage of the time-preparatory terminal NPRT is lowered.

The power-time generating unit 213 causes a time period from activation of the time setting signal XTS to activation of the reset driving signal RST to be fixed to the power time tpw regardless of the cycle of the oscillation output signal XOSC.

Thus, the length of the on-time of time setting signal XTS is fixed to the power time tpw regardless of the cycle of the oscillation output signal XOSC.

Referring back to FIG. 1, the power driving unit 260 receives the time setting signal XTS and the inverted time setting signal XTSB, and generate the power driving signal XPWD and the rectification driving signal XRED.

In this case, pull-up voltages of the power driving signal XPWD and the rectification driving signal XRED are equal to the input supply voltage VIN, and are level-shifted with respect to the internal supply voltage VDD used as pull-up voltages of the time setting signal XTS and the inverted time setting signal XTSB.

Also, the power driving unit 260 controls the power driving signal XPWD and the rectification driving signal XRED not to overlap with each other when these signals are activated.

The voltage-controlled oscillating block 300 generates the oscillation output signal XOSC, the cycle of which is controlled by an oscillation control signal XCST.

In the present embodiment, the voltage-controlled oscillating block 300 uses the internal supply voltage VDD as a pull-up voltage.

Figure 4:
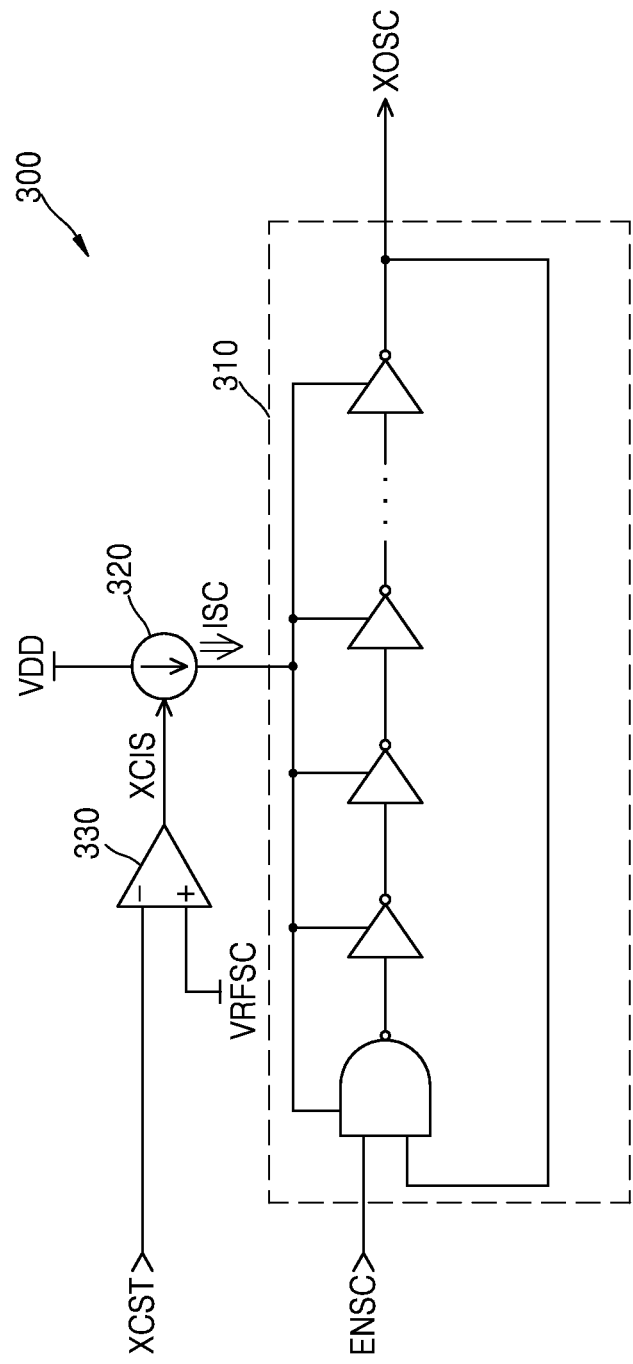
FIG. 4 is a detailed circuit diagram of a voltage-controlled oscillating block of FIG. 1.

FIG. 4 is a detailed circuit diagram of the voltage-controlled oscillating block 300 of FIG. 1.

Referring to FIG. 4, the voltage-controlled oscillating block 300 includes an oscillating unit 310, a sourcing-current supply unit 320, and current control unit 330.

The oscillating unit 310 generates the oscillation output signal XOSC. A cycle of the oscillation output signal XOSC is controlled according to the amount of sourcing current ISC. In the present embodiment, the cycle of the oscillation output signal XOSC increases as the amount of the sourcing current ISC decreases.

Also, in the present embodiment, the oscillating unit 310 is disabled when an oscillation enable signal ENSC is deactivated to logic low 'L'. In this case, when a DC-DC converter according to an exemplary embodiment of the present invention does not operate, the oscillating unit 310 is disabled. As a result, power consumption in the oscillating unit 310 decreases.

The sourcing-current supply unit 320 supplies the sourcing current ISC to the oscillating unit 310. The amount of the sourcing current ISC is controlled according to a voltage of a current control signal XCIS. In the present embodiment, the amount of the sourcing current ISC decrease as the voltage of the current control signal XCIS increases.

The current control unit 330 supplies the current control signal XCIS to the sourcing-current supply unit 320. The current control signal XCIS has a level according to the level of the oscillation control signal XCST. In the present embodiment, the current control unit 330 is implemented with a comparator in which the oscillation control signal XCST is supplied to a negative (−) input terminal, an oscillation reference voltage VRFSC is supplied to a positive (+) input terminal, and the current control signal XCIS is provided via an output terminal. Thus, in the present embodiment, the level of the current control signal XCIS increases as the level of the oscillation control signal XCST decreases.

Consequently, in the voltage-controlled oscillating block 300 having the structure of FIG. 4, the cycle of the oscillation output signal XOSC increases as the level of the oscillation control signal XCST decreases.

In this embodiment, the voltage-controlled oscillating block 300 is directly controlled according to the level of the oscillation control signal XCST reflecting any change of the output voltage VOUT. Thus, the output voltage VOUT may be rapidly stabilized to the target level VTAG.

Referring back to FIG. 1, the target tracking block 400 controls the oscillation control signal XCST such that a feedback voltage VFB tracks a predetermined target reference voltage VRFTG so as to stabilize the output voltage VOUT to the target level VTAG.

In this embodiment, the feedback voltage VFB depends on the output voltage VOUT. The target reference voltage VRFTG is set to correspond to the target level VTAG of the output voltage VOUT.

In detail, the target tracking block 400 includes a voltage-dividing unit 410 and a proportional integral derivative (PID) control unit 430.

The voltage-dividing unit 410 generates the feedback voltage VFB by dividing the output voltage VOUT.

The PID control unit 430 controls the level of the oscillation control signal XCST by performing PID correction on a tracking error VER, so that the feedback voltage VFB may follow the target reference voltage VRFTG.

Here, the tracking error VER is the difference between the target reference voltage VRFTG and the feedback voltage VFB.

In the present embodiment, the PID control unit 430 uses the internal supply voltage VDD as a pull-up voltage.

Figure 5:
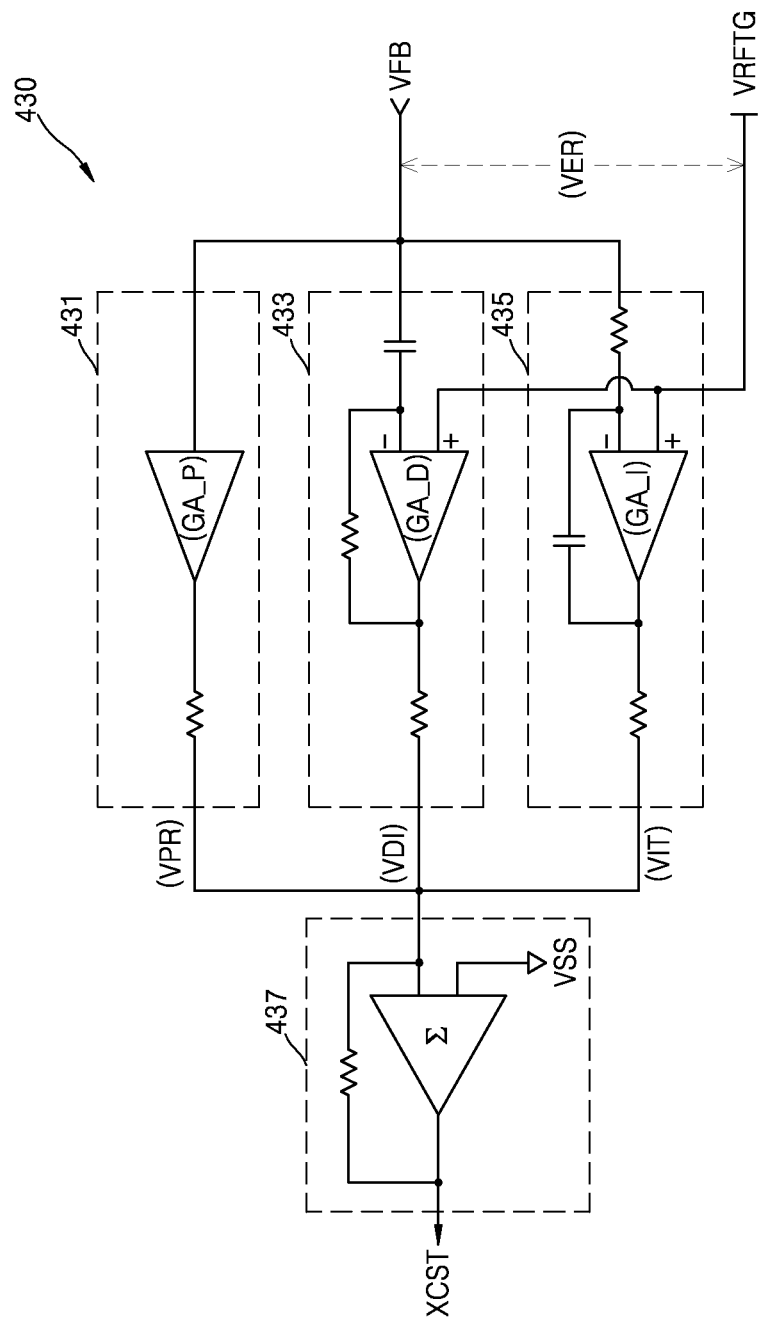
FIG. 5 is a detailed circuit diagram of a proportional integral derivative (PID) control unit of FIG. 1.

FIG. 5 is a detailed circuit diagram of the PID control unit 430 of FIG. 1.

Referring to FIG. 5, the PID control unit 430 includes a proportional control unit 431, a differential control unit 433, an integral control unit 435, and an adding unit 437.

The proportional control unit 431 generates a proportional voltage VPR by reflecting a proportional gain rate GA_P into the feedback voltage VFB. The differential control unit 433 generates a differential voltage VDI by reflecting a differential gain rate GA_D into a differential error generated when differentiation is conducted on the tracking error VER. The integral control unit 435 generates an integration voltage VIT by reflecting an integration gain rate GA_I into an integration error generated when integration is conducted on the tracking error VER.

The adding unit 437 generates the oscillation control signal XCST by adding the proportional voltage VPR, the differential voltage VDI, and the integration voltage VIT together.

Through the above operations of the PID control unit 430, the tracking error VER is controlled to substantially become zero (0). In other words, the feedback voltage VFB follows the target reference voltage VRFTG.

As a result, the output voltage VOUT may be controlled to have the target level VTAG.

The restoring of the output voltage VOUT to a target level when the input supply voltage VIN fluctuates in a DC-DC converter according to an exemplary embodiment of the present invention will be described with reference to the signals.

Figure 6:
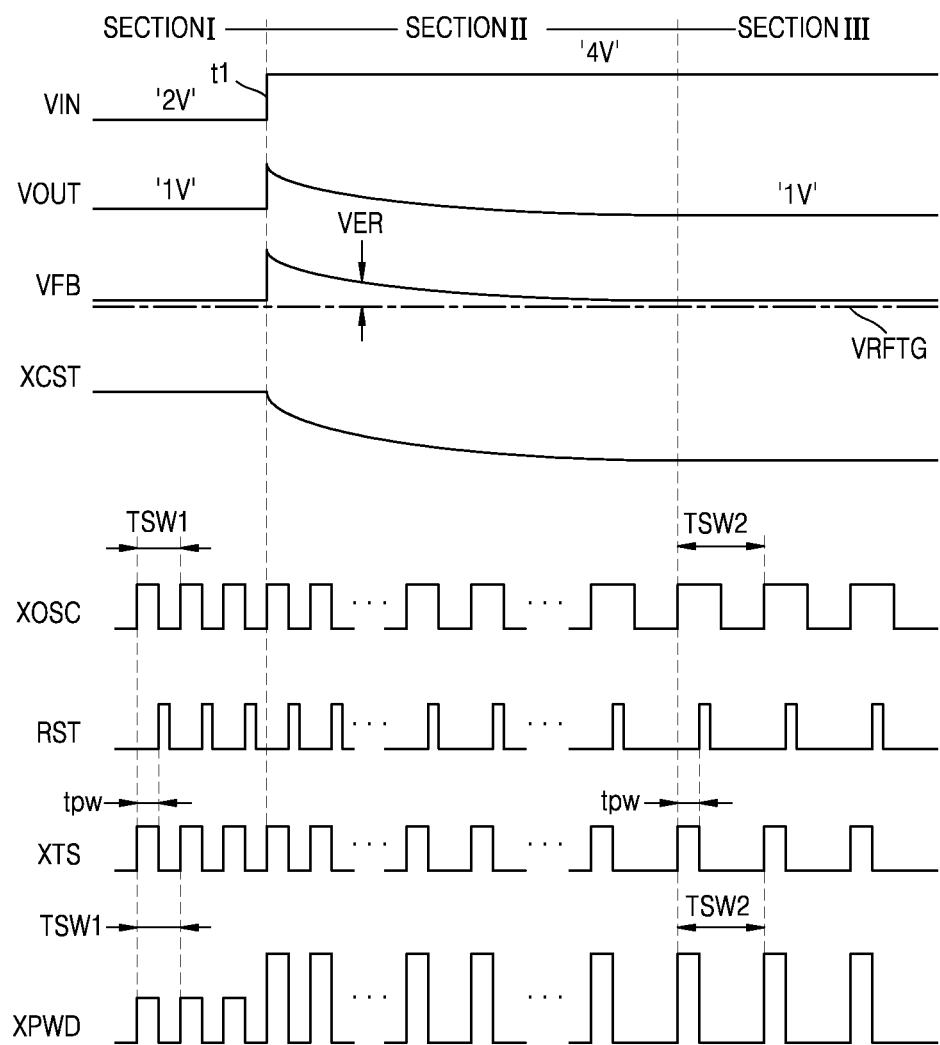
FIG. 6 is a graphical view of signal waveforms of the various signals in a DC-DC converter according to an exemplary embodiment of the present invention.

FIG. 6 is a graphical view of signal waveforms of the various signals in a DC-DC converter according to an exemplary embodiment of the present invention.

Referring to FIG. 6, a target level of an output voltage VOUT to be converted from the input supply voltage VIN is, for example, 'V'.

Section I denotes a section in which the input supply voltage VIN has not yet changed. In the Section I, for example, the input supply voltage VIN is '2 V' and the output voltage VOUT is '1 V' which is the same as the target level VTAG. In FIG. 6, 'TSW1' denotes a switching cycle of the power driving signal XPWD, and 't_on' denotes on-time of the power driving signal XPWD. In this embodiment, the on-time t_on of the power driving signal XPWD is a half of its switching cycle TSW1. Thus, a duty cycle of the power driving signal XPWD is 50%.

At time t1 in FIG. 6, the input supply voltage VIN increases to '4 V'. Since the duty cycle of the power driving signal XPWD is 50% at that point, the output voltage VOUT increases to '2 V'.

The output voltage VOUT may increase according to a predetermined slope as the input supply voltage VIN increases. Or, as shown in FIG. 6, the output voltage VOUT may rapidly increase.

In FIG. 6, the length of Section II is exaggerated to more clearly explain variations of the signals. Section II denotes a section in which the increased output voltage VOUT is restored to the target level VTAG.

At time t1, the feedback voltage VFB increases as the output voltage VOUT increases. Thus, a tracking error VER corresponding to the difference between the feedback voltage VFB and the target reference voltage VRFTG occurs.

In Section II, the oscillation control signal XCST starts to decrease due to occurrence of the tracking error VER at time t1. Thus, the cycle of the oscillation output signal XOSC gradually increases from 'TSW1' to 'TSW2'. The cycle of the time setting signal XTS also gradually increases from 'TSW1' to 'TSW2'.

Thus, in Section II, the cycle of the power driving signal XPWD also gradually increases from 'TSW1' to 'TSW2'. In the present embodiment, the length of the cycle 'TSW2' is double the length of the cycle 'TSW1'.

In a DC-DC converter according to an exemplary embodiment of the present invention, the length of on-time of the time setting signal XTS is fixed to the power time tpw regardless of a change in the cycle of the oscillation output signal XOSC.

Thus, the length of on-time of the power driving signal XPWD is also fixed to the power time tpw regardless of a change in the cycle of the oscillation output signal XOSC.

As a result, the duty cycle of the power driving signal XPWD gradually decreases.

As described above, the restoring of the output voltage VOUT is performed while the tracking error VER is removed (i.e., substantially becomes zero) and thus the feedback voltage VFB follows the target reference voltage VRFTG In FIG. 6, Section III is a section in which the output voltage VOUT has been restored to the target level VTAG. In Section III, the input supply voltage VIN is '4 V' but the duty cycle of the power driving signal XPWD is 25%. Thus, the output voltage VOUT is restored to '1 V' which is the target level VTAG. In Section III, the on-time of the power driving signal XPWD is fixed to the power time tpw as in Section I.

In other words, the DC-DC converter according to an exemplary embodiment of the present invention employs a fixed on-time method in which the lengths of on-time of the time setting signal XTS and the power driving signal XPWD are fixed to the same power time tpw. The DC-DC converter of this exemplary embodiment is thus capable of restoring the output voltage VOUT to the target level even when the input supply voltage VIN fluctuates without including or using a ripple generator that has high current consumption and a complicated circuit structure. Thus, the DC-DC converter according to an exemplary embodiment of the present invention has a simpler circuit structure, is more resistant to noise, and has lower current consumption compared with the conventional DC-DC converters.

In particular, in the DC-DC converter according to an exemplary embodiment of the present invention, the voltage-controlled oscillating block 300 is directly controlled according to the level of the oscillation control signal XCST reflecting any change of the output voltage VOUT.

Accordingly, the DC-DC converter according to an exemplary embodiment of the present invention is capable of rapidly stabilizing the output voltage VOUT to the target level VTAG.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A direct current to direct current (DC-DC) converter comprising:
   a voltage converting block that converts an input supply voltage to an output voltage having a target level, the voltage converting block including a power switch which is turned on at on-time of a power driving signal, wherein the input supply voltage is applied through the power switch when the power switch is turned on;
   a power driving block that generates the power driving signal using an oscillation output signal, wherein a cycle of the power driving signal varies in accordance with a cycle of the oscillation output signal and a length of the on-time of the power driving signal is fixed to a power time regardless of variation of the cycle of the oscillation output signal;
   a voltage-controlled oscillating block that generates the oscillation output signal, the cycle of the oscillation output signal being controlled according to a level of an oscillation control signal; and
   a target tracking block that generates a feedback voltage using the output voltage and controls the level of the oscillation control signal such that the feedback voltage follows a target reference voltage to stabilize the output voltage to the target level,
   wherein the power driving block comprises:
   a time setting unit that generates a time setting signal using the oscillation output signal, wherein a cycle of the time setting signal varies in accordance with the cycle of the oscillation output signal, and a length of on-time of the time setting signal is fixed to the power time; and
   a power driving unit that receives the time setting signal and generates the power driving signal, wherein a pull-up voltage of the power driving signal is level-shifted with respect to a pull-up voltage of the time setting signal,
   wherein the time setting unit comprises:
   a flip-flop that generates the time setting signal responding to the oscillation output signal and a reset driving signal, wherein the time setting signal is activated in response to the oscillation output signal and deactivated in response to the reset driving signal; and
   a power-time generating unit that generates the reset driving signal using the time setting signal, the reset driving signal being activated when a time corresponding to the power time elapses from the activation of the time setting signal.

2. The DC-DC converter of claim 1, wherein a level of the feedback voltage increases as a level of the output voltage increases, the level of the oscillation control signal decreases as the level of the feedback voltage increases, the cycle of the oscillation output signal increases as the level of the oscillation control signal decreases, the cycle of the time setting signal increases as the cycle of the oscillation output signal increases, and the cycle of the power driving signal increases as the cycle of the time setting signal increases.

3. The DC-DC converter of claim 2, wherein the length of the on-time of the time setting signal and the length of the on-time of the power driving signal maintain a same time period as the power time while the cycle of the time setting signal and the cycle of the power driving signal increase.

4. The DC-DC converter of claim 1, wherein the flip-flop is an RS flip-flop that receives the oscillation output signal via a set terminal, receives the reset driving signal via a reset terminal, and provides the time setting signal via an output terminal.

5. The DC-DC converter of claim 1, wherein the power-time generating unit comprises:
   a time capacitor formed between a ground voltage and a time-preparatory terminal;
   a charging transistor formed between an internal supply voltage and the time-preparatory terminal, the charging transistor being turned on to charge the time capacitor in response to the activation of the time setting signal;
   a discharging transistor formed in parallel with the time capacitor between the ground voltage and the time-preparatory terminal, the discharging transistor being turned on and driven to discharge the time capacitor in response to deactivation of the time setting signal; and
   a time comparator that generates the reset driving signal by comparing a voltage of the time-preparatory terminal with a time reference voltage.

6. A direct current to direct current (DC-DC) converter comprising:
   a voltage converting block that converts an input supply voltage to an output voltage having a target level, the voltage converting block including a power switch which is turned on at on-time of a power driving signal, wherein the input supply voltage is applied through the power switch when the power switch is turned on;
   a power driving block that generates the power driving signal using an oscillation output signal, wherein a cycle of the power driving signal varies in accordance with a cycle of the oscillation output signal and a length of the on-time of the power driving signal is fixed to a power time regardless of variation of the cycle of the oscillation output signal;
   a voltage-controlled oscillating block that generates the oscillation output signal, the cycle of the oscillation output signal being controlled according to a level of an oscillation control signal; and
   a target tracking block that generates a feedback voltage using the output voltage and controls the level of the oscillation control signal such that the feedback voltage follows a target reference voltage to stabilize the output voltage to the target level,
   wherein the voltage-controlled oscillating block comprises:
   an oscillating unit that generates the oscillation output signal, wherein the cycle of the oscillation output signal varies according to an amount of a sourcing current;
   a sourcing-current supply unit that supplies the sourcing current to the oscillating unit, wherein the amount of the sourcing current varies according to a level of a current control signal; and
   a current control unit that generates the current control signal to the sourcing-current supply unit, wherein the level of the current control signal varies according to the level of the oscillation control signal.

7. The DC-DC converter of claim 6, wherein the oscillating unit is disabled in response to deactivation of an oscillation enable signal.

8. A direct current to direct current (DC-DC) converter comprising:
   a voltage converting block that converts an input supply voltage to an output voltage having a target level, the voltage converting block including a power switch which is turned on at on-time of a power driving signal, wherein the input supply voltage is applied through the power switch when the power switch is turned on;
   a power driving block that generates the power driving signal using an oscillation output signal, wherein a cycle of the power driving signal varies in accordance with a cycle of the oscillation output signal and a length of the on-time of the power driving signal is fixed to a power time regardless of variation of the cycle of the oscillation output signal;
   a voltage-controlled oscillating block that generates the oscillation output signal, the cycle of the oscillation output signal being controlled according to a level of an oscillation control signal; and
   a target tracking block that generates a feedback voltage using the output voltage and controls the level of the oscillation control signal such that the feedback voltage follows a target reference voltage to stabilize the output voltage to the target level,
   wherein the power driving block comprises:
   a time setting unit that generates a time setting signal using the oscillation output signal, wherein a cycle of the time setting signal varies in accordance with the cycle of the oscillation output signal, and a length of on-time of the time setting signal is fixed to the power time; and
   a power driving unit that receives the time setting signal and generates the power driving signal, wherein a pull-up voltage of the power driving signal is level-shifted with respect to a pull-up voltage of the time setting signal,
   wherein the time setting unit comprises:
   a flip-flop that generates the time setting signal responding to the oscillation output signal and a reset driving signal, wherein the time setting signal is activated in response to the oscillation output signal and deactivated in response to the reset driving signal; and
   a power-time generating unit that generates the reset driving signal using the time setting signal, the reset driving signal being activated when a time corresponding to the power time elapses from the activation of the time setting signal,
   wherein the target tracking block comprises a proportional integral derivative (PID) control unit that controls the level of the oscillation control signal by performing PID correction on a tracking error so that the feedback voltage follows the target reference voltage, wherein the tracking error corresponds to a difference between the target reference voltage and the feedback voltage.

9. The DC-DC converter of claim 8, wherein the PID control unit comprises:
   a proportional control unit that generates a proportional voltage by reflecting a proportional gain rate into the feedback voltage;
   a differential control unit that generates a differential voltage by reflecting a differential gain rate into a differential error that is generated when differentiation is conducted on the tracking error;

an integral control unit that generates an integration voltage by reflecting an integration gain rate into an integration error that is generated when integration is conducted on the tracking error; and an adding unit that generates the oscillation control signal by adding the proportional voltage, the differential voltage, and the integration voltage.

10. The DC-DC converter of claim 9, wherein the target reference voltage is provided to the differential control unit and the integral control unit to conduct the differentiation and integration, respectively, on the tracking error.

11. The DC-DC converter of claim 8, wherein the target tracking block further comprises a voltage-dividing unit that generates the feedback voltage to the PID control unit by dividing the output voltage.

* * * * *